United States Patent [19]

Tingskog

[11] 4,286,909
[45] Sep. 1, 1981

[54] APPARATUS FOR UNLOADING BULK MATERIAL FROM A STORAGE SPACE

[75] Inventor: Karl A. L. Tingskog, Helsingborg, Sweden

[73] Assignee: AB Siwertell, Bjuv, Sweden

[21] Appl. No.: 29,090

[22] Filed: Apr. 11, 1979

[30] Foreign Application Priority Data

Apr. 12, 1978 [SE] Sweden ................................ 7804113

[51] Int. Cl.³ .............................................. B65G 65/38
[52] U.S. Cl. ..................... 414/144; 37/191 A; 198/511; 414/133; 414/139; 414/140; 414/145; 414/321; 414/326; 414/327
[58] Field of Search ............... 414/320, 321, 304, 305, 414/313, 317, 325–327, 137, 138, 145, 139, 140, 133, 144; 198/509, 511, 512, 513, 514, 515, 516, 517, 518, 519; 37/189, 190, 191, 192

[56] References Cited

U.S. PATENT DOCUMENTS

| 3,788,445 | 1/1974 | Postel-Vinay | 198/511 |
| 3,836,019 | 9/1974 | Aralt | 414/139 |
| 3,990,567 | 11/1976 | Siwersson et al. | 414/139 X |

FOREIGN PATENT DOCUMENTS

| 1481450 | 4/1969 | Fed. Rep. of Germany | 414/133 |
| 1912420 | 9/1970 | Fed. Rep. of Germany | 414/133 |
| 699355 | 12/1930 | France | 414/313 |
| 401647 | 1/1943 | Italy | 414/313 |

Primary Examiner—Frank E. Werner
Attorney, Agent, or Firm—Beveridge, DeGrandi, Kline & Lunsford

[57] ABSTRACT

An apparatus for unloading bulk material from a storage space includes an upward conveyor (14), in particular a screw conveyor. For scraping the bulk material to the inlet end (22) of the upward conveyor (14), there is a scraper conveyor (27, 28) which is pivotally movable up and down and is telescopically extensible. The scraper conveyor is pivotally connected to a protective tube (24) which is rotatable and extends about the upward conveyor (14). The protective tube is located within a pressure-absorbing pipe which prevents the bulk material from impeding the rotational movement of the protective tube. This arrangement makes it possible for the scraper conveyor to remove bulk material from different regions of the storage space, including corners.

9 Claims, 13 Drawing Figures

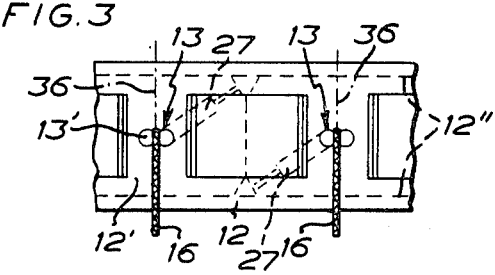
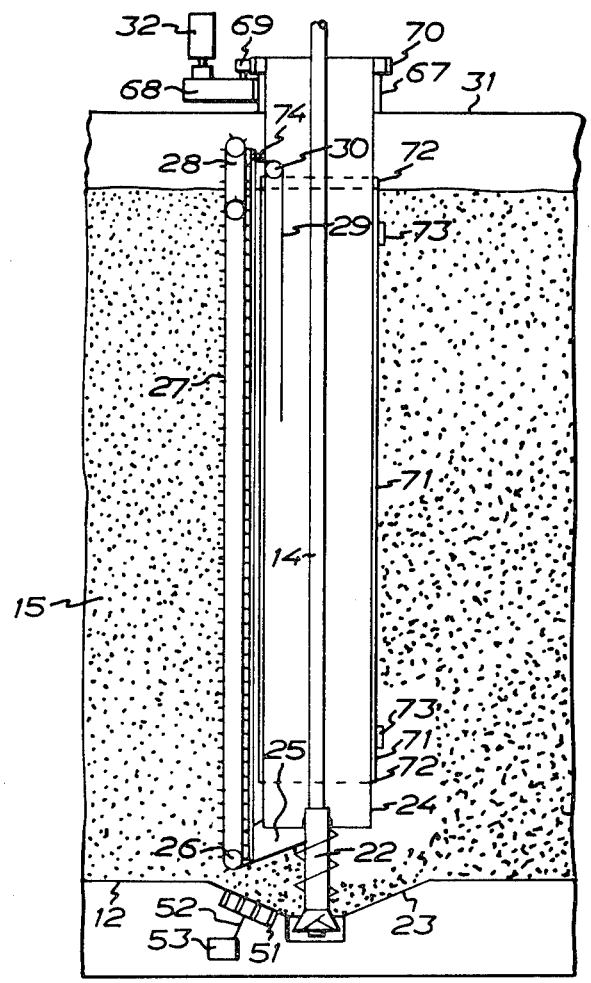

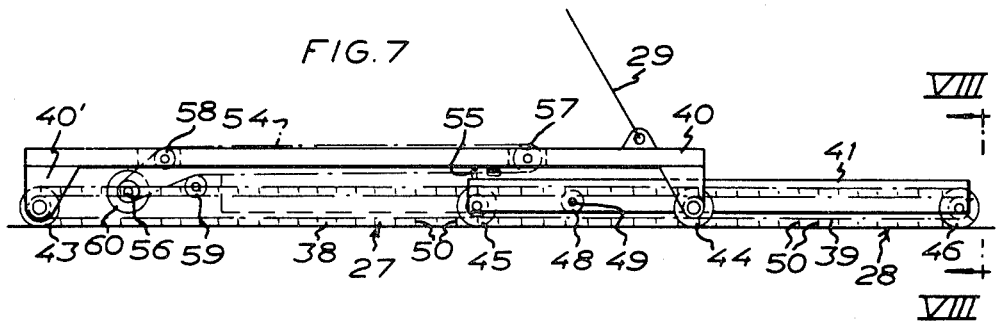
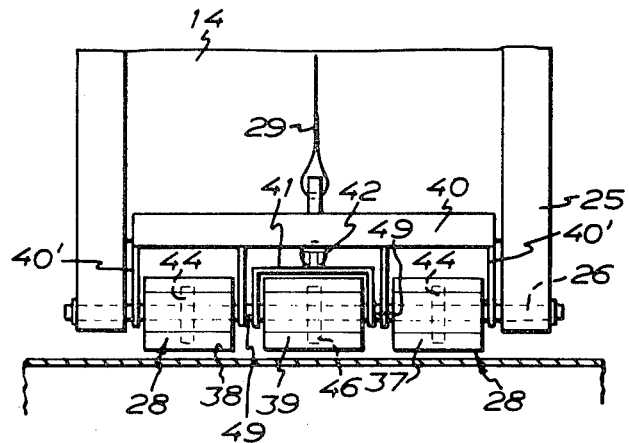
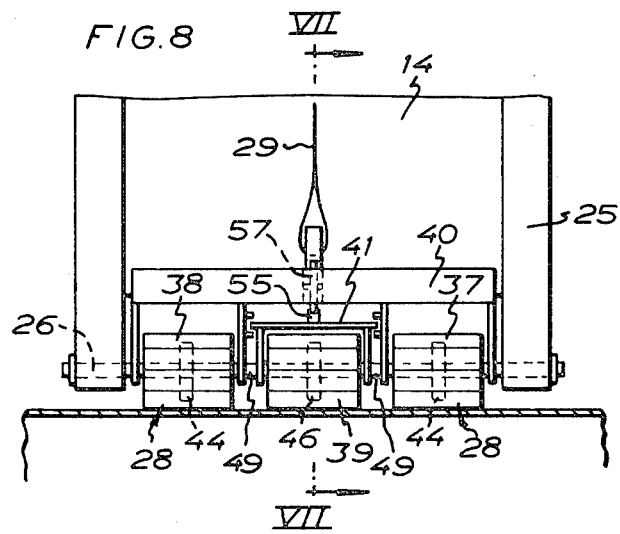

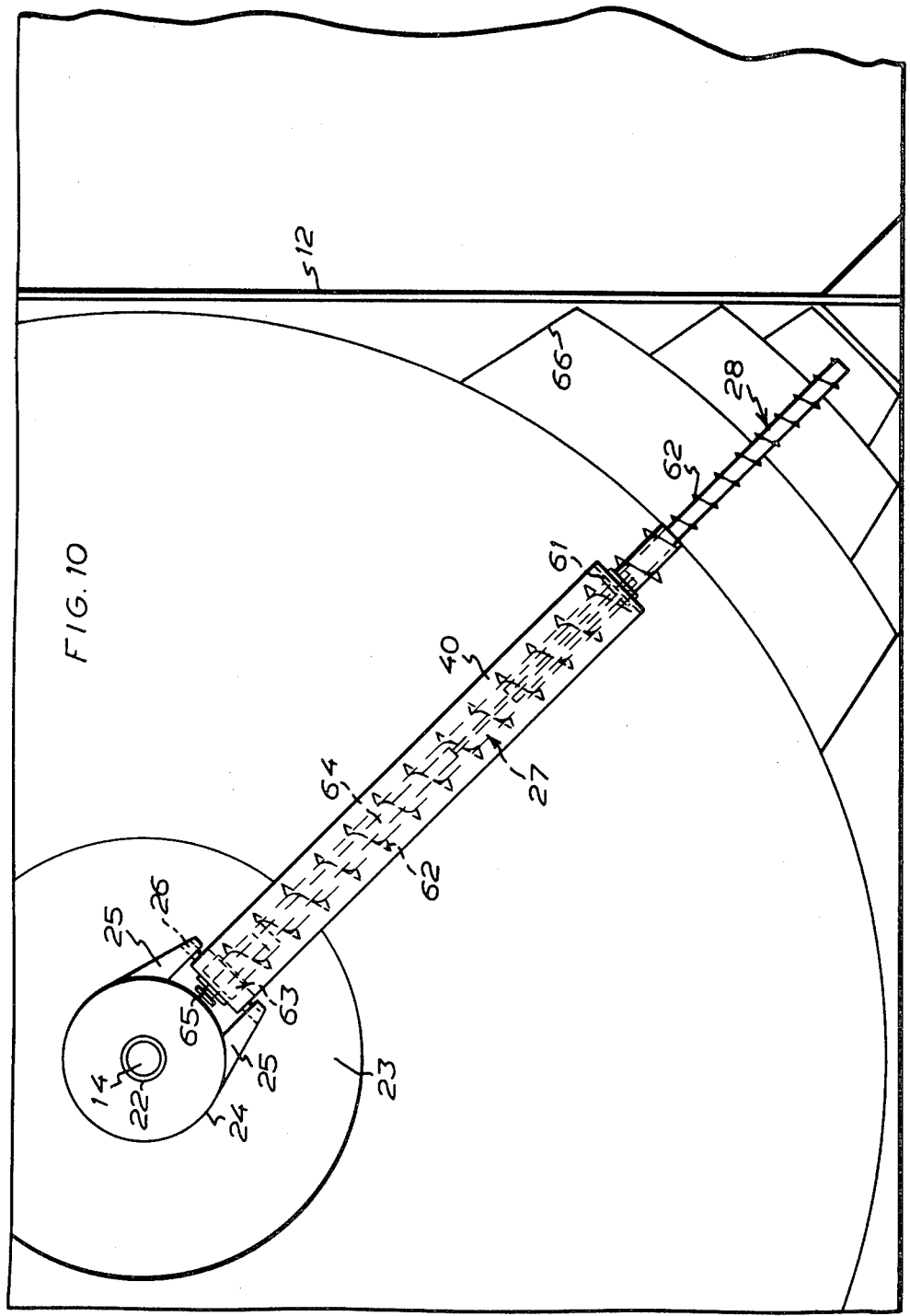

APPARATUS FOR UNLOADING BULK MATERIAL FROM A STORAGE SPACE

BACKGROUND

In the unloading of bulk material from such storage spaces as cargo holds in bulk transport vessels, use has often been made of land-based unloading apparatuses with a conveyor suspended on a crane arm, this conveyor being called a vertical conveyor and whose purpose is to convey bulk material up from the storage space. It has been possible, by means of the land-based crane device, to move the vertical conveyor to different parts of the storage hold for removing major fraction of the bulk material. Land-based unloading apparatuses of this type are relatively expensive and do not occur in all harbours where unloading of bulk material is desired. As a result, it has become the practice to install in vessels diverse types of fixed unloading apparatuses. The prior art unloading apparatuses installed in vessels are highly complex and have the disadvantage that they do not make possible a substantially complete removal of all bulk material. Particular difficulties have also arisen in the unloading of such difficult bulk materials as soya bean derivate, cement or alumina.

One object of the present invention is to provide a novel apparatus for unloading bulk material from a storage space, for example a cargo hold or a silo, this apparatus, which, in a known manner, comprises a vertical conveyor whose inlet end is located close to the bottom of the storage space, making possible a more extensive machine-operated emptying of the storage space than has hitherto been possible with prior art unloading apparatuses in a corresponding price range. Other objects of the present invention will be apparent from the following description.

SUMMARY OF THE INVENTION

The apparatus according to the present invention is intended for unloading bulk material from a storage space, such as a cargo hold or a silo, and comprises a vertical conveyor whose inlet end is located proximal the bottom of the storage space, and a scraper device which is disposed to scrape the bulk material in a direction towards the inlet end of the vertical conveyor, and is swingable about the vertical conveyor and has its one end pivotally journaled proximal the inlet end of the vertical conveyor for purposes of being pivoted between a raised position in which the scraper device extends upwardly substantially along the vertical conveyor, and a lowered position in which the scraper device extends along the floor of the storage space, the apparatus according to the invention being characterized in that the scraper device is telescopically extensible and is, at its above-mentioned one end, raisably and lowerably pivotally journaled on a protective tube disposed about the vertical conveyor, this protective tube being rotatable about the vertical conveyor for swinging the scraper device around the vertical conveyor.

In this instance, the scraper device may be provided with a series of scrapers fixedly disposed on chains. Another possibility is to design the scraper device as a screw with at least one outer scraper flight extending along a helical line.

The vertical conveyor has, preferably, a feeding device at its inlet end, and this feeding device may extend down into a supply well disposed about the vertical conveyor the scraper device conveying the bulk material to the well. In this case, the well may be provided with an apparatus for producing a thin air cushion between the bottom of the well and the bulk material, which may be advantageous in the unloading of such materials as cement, alumina and soya bean derivate. Precisely in conjunction with the unloading of soya bean derivate and the like, problems may occur when the load in the vessel is compacted during the sea journey. In such an event, the load may press hard against the vertical conveyor or its protective tube so that it may be difficult to commence the unloading operation. In such a case, it is advantageous, according to a further development of this invention, to have the protective tube extend through a pressure absorbing pipe in which the protective tube is rotatably disposed. The scraper conveyor is designed, in such an instance, suitably as a telescopic scraper conveyor which is laterally open so that the conveyor may move laterally through the bulk material. Another possibility is to utilize a scraper conveyor in the form of a telescopic feed screw with an outer scraper flight extending along a helical line. At the commencement of the unloading operation, the scraper device is allowed progressively to excavate an annular space around the pressure-absorbing pipe, whereafter the normal unloading operation may begin.

As was mentioned above, the scraper device should be telescopically extensible in order that it may, on rotation about the vertical conveyor, be extended out to all corners and regions of the storage space. This extensibility may be realized by means of a hydraulic piston and cylinder assembly, but is also possible to use other extension devices. If the scraper device is a chain scraper conveyor, it is advantageous to provide three scraper chains beside each other, the middle scraper chain being disposed on a frame unit which may be longitudinally protracted with respect to the other two scraper chain devices.

If the scraper device has, on the other hand, the form of a screw conveyor with an outer helical scraper flight, this extensibility may be realized by fashioning the screw conveyor from two or more tubes which may be telescopically inserted into one another and each have an outer helical scraper flight.

The nature of the present invention and its aspects will be more readily understood from the following brief description of the accompanying drawings, and discussion relating thereto.

DESCRIPTION OF THE DRAWINGS

In the accompanying drawings:

FIG. 3 is a schematic illustration of a section of a vessel, seen from above, and shows a different location of the unloading apparatus in the cargo hold of the vessel;

FIG. 6 is a section along the line VI—VI in FIG. 4; and thus, is an end elevation of the scraper device;

FIG. 7 illustrates a modification of the scraper device of FIG. 4;

FIG. 8 is a section taken along the line VIII—VIII in FIG. 7 and, thus, is an end elevation of the scraper device;

FIG. 10 is a section taken along the line X—X in FIG. 9;

FIG. 11 is a schematic section through a further embodiment of an unloading apparatus according the invention.

DESCRIPTION OF THE PREFERRED EMBODIMENTS

Figure 1:
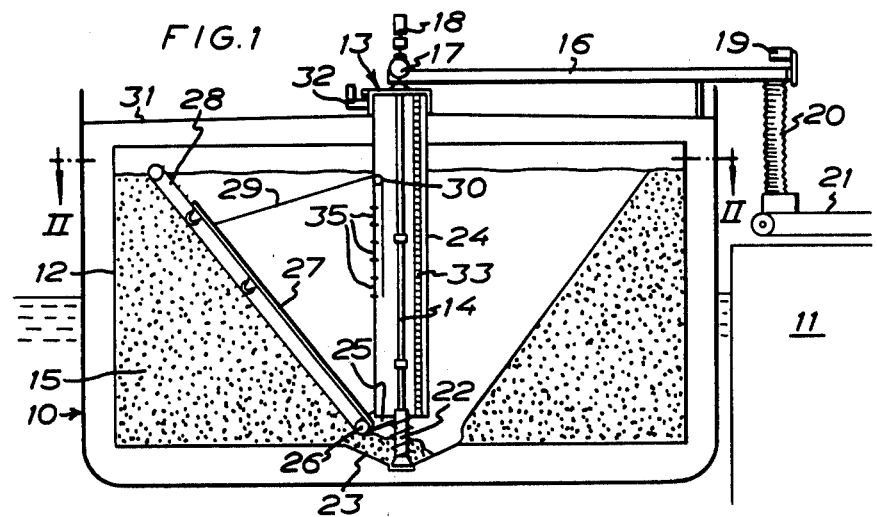
FIG. 1 is a schematic section through a cargo hold in a bulk transport vessel which has an unloading apparatus according to the present invention.

FIG. 1 shows a vessel 10 which is moored at a quay 11. An unloading apparatus 13 according to the invention is disposed in the cargo hold 12 of the vessel. The unloading apparatus has a vertical conveyor 14 which serves to lift bulk material 15 located in the hold of the vessel up to a horizontal conveyor 16. The horizontal conveyor and the vertical conveyor are interconnected by the intermediary of some suitable transition device 17. In the illustrated embodiment, both the vertical conveyor 14 and the horizontal conveyor 16 consist of screw conveyors. The vertical conveyor is driven by means of a motor 18, the horizontal conveyor being driven by means of a motor 19. The outlet end of the horizontal conveyor is connected to a chute 20 through which the unloaded bulk material falls down to a land-based removal conveyor 21.

Figure 4:
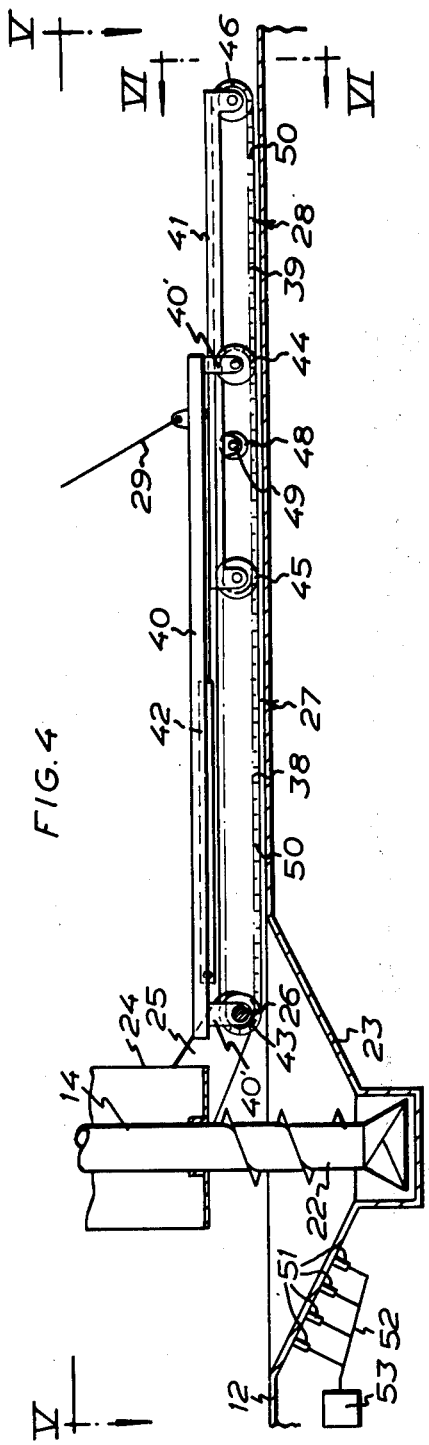
FIG. 4 is a schematic vertical section through the lower end of an unloading apparatus according to the present invention.
Figure 5:
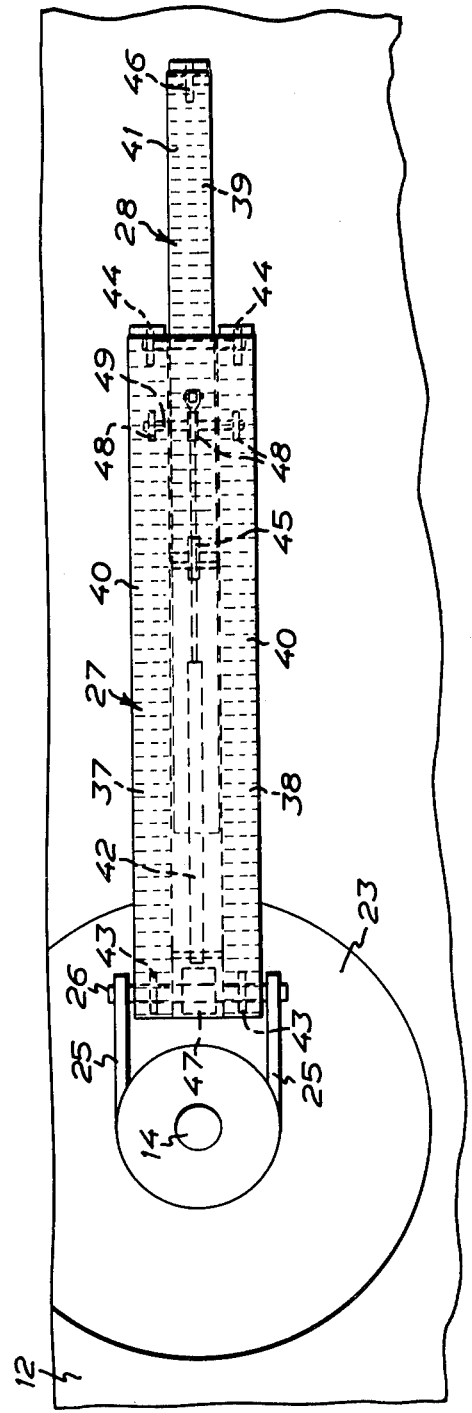
FIG. 5 is a section taken along the line V—V in FIG. 4.

At its inlet end, the vertical conveyor 14 is connected to a feeding device 22 which positively feeds the bulk material into the inlet end of the screw conveyor. The feeding device 22 extends down into a well 23 whose bottom slopes down towards the feeding device 22. The feeding device and the vertical conveyor extend through a protective tube 24 which, at its lower end, has a yoke 25, a shaft 26 being mounted on the ends of the yoke prongs. The purpose of the shaft 26 is for pivotal mounting of a scraper conveyor 27. The scraper conveyor may be designed as, for example, is shown in FIGS. 4–6 and has a protractile section 28. The scraper conveyor 27 is connected by means of a hoist cable 29 to a hoist device 30 which is disposed within the protective tube 24 and which serves to regulate the angular position of the scraper conveyor with respect to the protective tube 24.

At its upper end, the protective tube 24 is pivotally connected to the ceiling 31 of the hold. A motor 32 is provided for realizing rotation of the protective tube.

Moreover, a ladder 33 may be provided within the protective tube, allowing personnel to climb down into the hold for carrying out service and maintenance operations.

Figure 2:
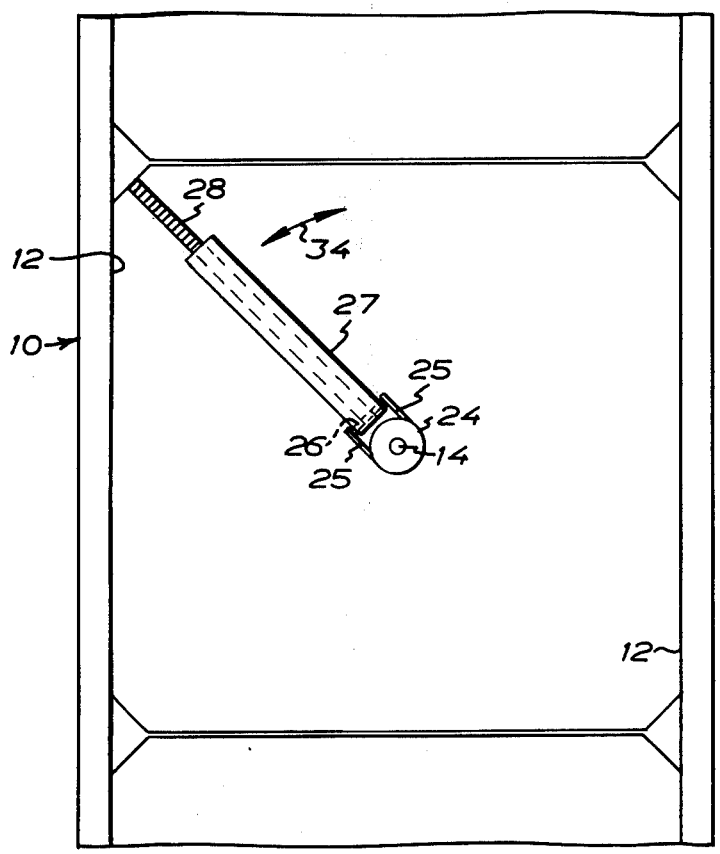
FIG. 2 is a schematic section taken along the line II—II in FIG. 1, the scraper conveyor being, however, located in a different pivotal position.

The above-described unloading apparatus functions as follows:

In the normal situation, the scraper conveyor 27, 28 is located in its raised position, extending along the outer side of the protective tube 24 and being, thus, substantially parallel to the vertical conveyor 14. The scraper conveyor assumes this position when the vessel is being loaded. When unloading is later to be commenced, the horizontal conveyor 16 is swung out to the position shown in FIG. 1, and unloading is commenced in that the vertical conveyor 14 and its feeding device 22 are started. If the material in the cargo hold may be classified as free-flowing material, the unloading operation may proceed simply by means of the vertical conveyor until such time as a crater with the normal angle of repose for the material in question has been formed. Thereafter, the scraper conveyor 27, 28 is swung by means of the hoist device 29, 30 into contact with the material 15, for example as shown in FIG. 1. The scraper conveyor is, here, caused to scrape the material down towards the well 23 and towards the feeding device 22 projecting into the well. The scraper conveyor is then allowed progressively to scrape material from all regions of the hold towards the well 23. Under this operation, the protective tube 24 and the scraper conveyor 27, 28 are swung in either of the directions shown by the double arrow 34 (FIG. 2). During this swinging motion, the scraper conveyor is protracted or retracted as the need arises, so that the outer end of the scraper conveyor is constantly located proximal the walls of the cargo hold 12. FIG. 2 shows a protraction position where the outer region 28 has been protracted right out into a corner of the cargo hold. During the progressive unloading of the material, the scraper conveyor is successively lowered by means of the hoist device 29, 30 until it finally scrapes the last of the bulk material from the floor of the hold.

In order to make for rational unloading, it is possible to provide windows 35 at different heights on the protective tube 24, through which the staff managing the unloading operation may observe the work of the scraper conveyor and thereby regulate the rotation of the protective tube 24 and the lowering position of the scraper conveyor 27, 28.

FIG. 2 shows a construction where the vertical conveyor of the unloading apparatus has been placed centrally in the hold. This is a preferred location of the apparatus if the center of the hold is accessible for this purpose. However, it is sometimes more advantageous to select other locations of the unloading apparatus. FIG. 3 shows another possibility in which each hold is provided with two unloading apparatuses 13 according to the invention. These unloading apparatuses are disposed at two opposing walls 36 between adjacent holds. Each vertical conveyor with its associated scraper conveyor 27 clears, in this instance, half of the hold.

In the embodiment according to FIG. 3, an unloading apparatus 13' has been disposed in an adjacent hold 12' on the opposite side of the hold wall 36. In the illustrated embodiment, both of the unloading apparatuses 13, 13' placed on either side of the hold wall 36 have a common horizontal conveyor 16. It is intimated by means of broken lines 12'' in FIG. 3 that the hold 12, 12' conically tapers downwardly, the cone angle being such that it approximately corresponds to the natural angle of repose of the contemplated bulk material.

Figure 12:
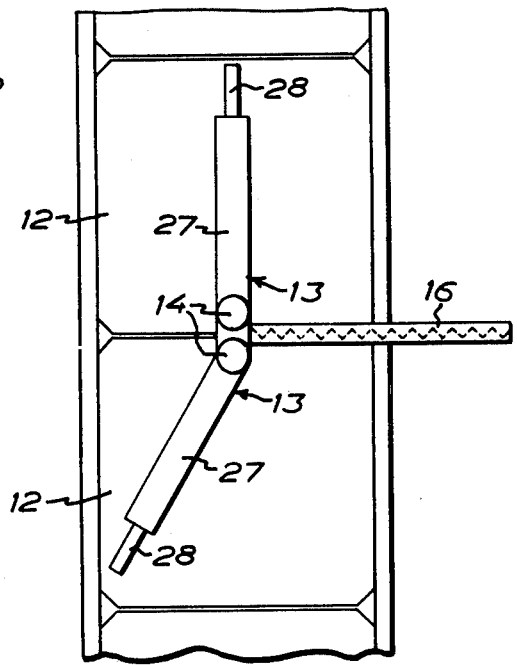
FIGS. 12 and 13 show two alternative locations, corresponding to FIGS. 2 and 3, of the unloading apparatus according to the invention.
Figure 13:
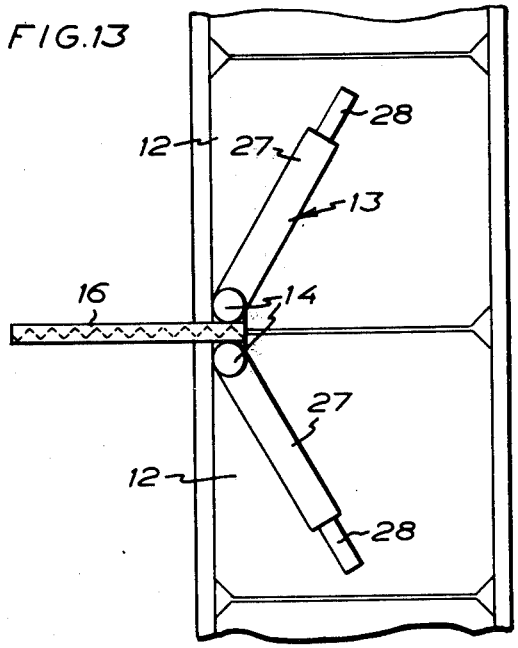

FIG. 12 shows a further example of how the unloading apparatus may be placed in a vessel hold. Here, one unloading apparatus 13 is placed in each hold 12 and the unloading apparatuses 13 in two adjacent holds are connected to a common horizontal conveyor 16. FIG. 13 shows a further example in which the unloading apparatuses 13 have each been placed in a corner of rectangular store or hold 12.

FIGS. 4–6 show an embodiment of a scraper conveyor in the unloading apparatus according to the invention. In these Figures, the same reference numerals have been utilized as in FIGS. 1 and 2.

As will be particularly apparent from FIGS. 5 and 6, the scraper conveyor 27, 28 is provided with three scraper chains 37, 38, 39. The scraper chains 37 and 38 are supported on downwardly projecting brackets 40′ on a box beam construction 40 which, at its one end, is pivotally journaled on the shaft 26. The scraper chain 39 is supported on a U-beam 41 whose shanks are turned to face downwardly and which may be inserted between the scraper chains 37, 38. The position of protraction is regulated by means of a hydraulic piston and cylinder assembly 42. The scraper chains 37, 38 run over sprockets 43, 44, whereas the scraper chain 39 runs over sprockets 45, 46. The sprocket 43 is driven by means of a motor 47 which, thus, directly drives the scraper chains 37, 38. On the other hand, the scraper chain 39 is driven indirectly by means of three sprockets 48 which are rigidly mounted on a common, rotatably journaled shaft 49. The three sprockets 48 each engage with their chain 37, 38, 39. The different chains 37, 38, 39 are provided with schematically illustrated scraper elements 50.

It will be apparent from FIG. 4 that the scraper conveyor 27, 28 may be lowered down into abutment with the floor of the hold 12 so that this floor may be scraped clean.

FIG. 4 also shows a possible embodiment with an air-cushioned or fluidized bottom in the well 23. Consequently, a number of nozzles 51 have been disposed in the bottom wall of the well, through which nozzles air may be injected into the bulk material in the well 23. The air is supplied via conduits 52 from a source of compressed air 53. This construction has been illustrated schematically, since its structure is generally known.

In the embodiment according to FIGS. 4-6, extension of the scraper conveyor 27, 28 is realized by means of the hydraulic piston and cylinder assembly 42. FIGS. 7 and 8 illustrate another possibility for realizing extensibility of the scraper conveyor 27, 28. The same reference numerals have been used in FIGS. 7 and 8 as in FIGS. 4-6 for identical components.

Instead of a hydraulic piston and cylinder assembly 42, use is made, in the embodiment according to FIGS. 7 and 8, of a chain 54, which, by means of a chain anchorage 55, is connected to the rear end of the beam 41 of the scraper conveyor 28, the beam being, in this case, a U-beam. As earlier, the beam 41 is guided for longitudinal movement with respect to the box beam 40. The chain 54 runs over return pulleys 56, 57 and guide pulleys 58, 59. All of these pulleys are rotatably journaled on stub shafts which are connected to the box beam 40. The one pulley, namely the return pulley 56, is driven by means of a hydraulic motor 60. Thus, when the hydraulic motor 60 is activated, the anchorage 55 may be moved along the box beam 40 with the consequential result that the beam 41 is shifted in a longitudinal direction.

The power transmission between the scraper chains 37, 38 and the scraper chain 39 is effected in the same manner as in FIGS. 4-6 by means of three sprockets 48 on a common shaft 49.

Figure 9:
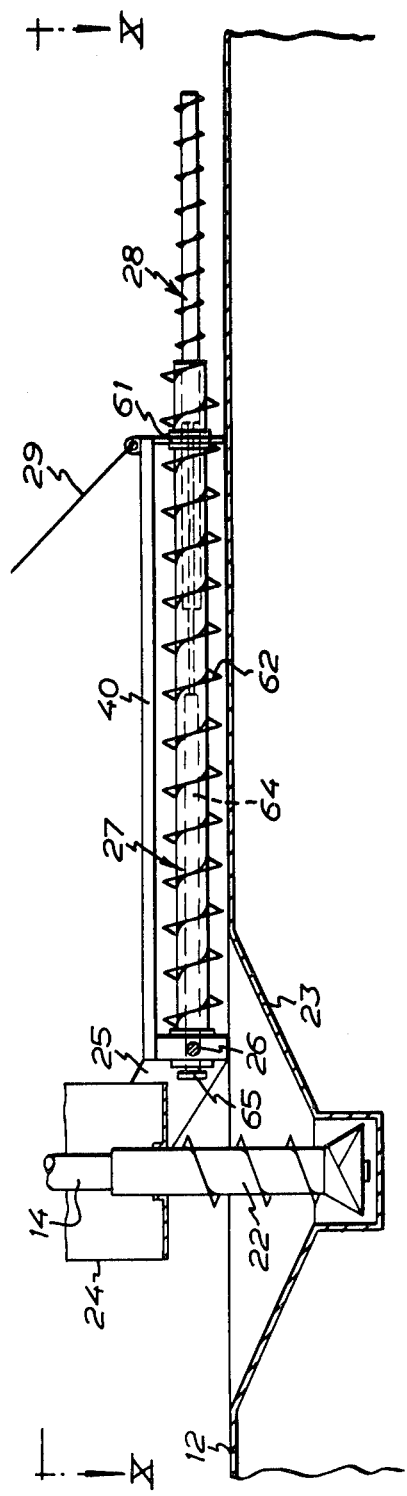
FIG. 9 is a schematic section through the lower portion of another embodiment of the unloading apparatus according to the invention.

FIGS. 9 and 10 show a further embodiment of the invention, the scraper conveyor 27, 28 having been designed in another manner. As in the earlier embodiments, the protective tube 24 is provided, at its lower end, with yokes 25 which support a shaft 26. The shaft 26 serves for journaling a box beam 40 which, at its outer end, is connected to the hoist cable 29. As in earlier embodiments, a well 23 is located in the floor of the hold 12 for the feeding device 22 of the vertical conveyor 14.

In FIGS. 9 and 10, the scraper conveyor 27, 28 has been designed as a telescopic screw conveyor with an outer helical scraper flight. The conveyor section 27 is, thus, a tubular conveyor which, in the proximity of its outer end, is journaled by means of a bearing 61 for rotation on the box beam 40. Correspondingly, there is a counterpart bearing at the other end of the box beam. The scraper conveyor 27 designed as a screw conveyor with an outer helical scraper flight, is driven by means of a motor 63. The correspondingly designed scraper conveyor 28 is telescopically disposed in the scraper conveyor 27. The position of the scraper conveyor 28 with respect to the scraper conveyor 27 is regulated by means of a hydraulic piston and cylinder assembly 64 which is disposed within the scraper conveyor 27 and whose cylinder housing is rotatably journaled in a bearing 65. The two supply screws or the scraper conveyors 27, 28 are non-rotary with respect to each other and will, thus, rotate together about their common geometric axis.

FIG. 10 illustrates how it is possible to cause the scraper conveyor 27, 28 to work on rotation of the scraper conveyor about the vertical geometric axis of the vertical conveyor 14. Thus, the scraper conveyor 28 may gradually be protracted, the operational pattern 66 being thus obtained. The position of protraction of the scraper conveyor 28 both in this embodiment and in the remaining embodiments may be manually regulated, but may be mechanized by means of some form of cam action or other automatic steering so that any desired scraping pattern may be obtained, for example, rectangular.

FIG. 11 shows a section which corresponds to the section in FIG. 1, but which illustrates another embodiment of the unloading apparatus according to the invention.

As in the embodiment according to FIG. 1, the scraper conveyor 27, 28 has, at its lower end, been pivotally mounted on a yoke 25 which is fixedly mounted to the lower end of a protective tube 24 extending about the vertical conveyor 14. At its upper end, the protective tube 24 is rotatably supported on a construction 67 in the ceiling 31 of the hold. The tube 24 may be rotated by means of the motor 32, a gear unit 68 and a drive gear 69 which engages with a gear rim 70 on the upper end of the tube 24. In the embodiment according to FIG. 11, the protective tube 24 extends through a pressure-absorbing pipe 71 which is sealed at the top and bottom by means of a sealing 27 against the outside of the tube 24. The pipe 71 is preferably, but not necessarily, non-rotatably fixedly retained at the wall of the hold by means of brackets 73.

In the embodiment illustrated in FIG. 11, the scraper conveyor 27, 28 has been provided with scraper chains with open sides so that the scraper conveyor may be moved laterally through the bulk material. Alternatively, the scraper conveyors 27, 28 may be designed in accordance with the illustrations of FIGS. 9 and 10.

The construction according to FIG. 11 is particularly intended for non-freeflowing, non-fluidizable material, for example soya bean derivate. Such material is highly compacted against the pressure-absorbing pipe 71 and would, had it been packed directly against the protective tube 24, have created a considerable amount of friction which would have rendered rotation of the protective tube 24 difficult.

When the load commences to be unloaded, the scraper conveyors 27, 28 are immediately started and thereupon commence to draw material down towards the rotating feeding device 22 in the well 23. After a while, the rotation of the protective tube 24 about the vertical conveyor 14 is started by starting the motor 32 and its drive train 68, 69, 70. The scraper conveyor 27, 28 will then successively excavate a cylindrical crater around the pressure-absorbing pipe 71 which, during this operation, is retained in its position of rotation either by friction against the surrounding bulk material or by means of the brackets 73. Hereafter, the rotation of the protective tube 24 with its scraper conveyor 27, 28 continues, while the scraper conveyor 27, 28 is progressively lowered and kept in contact with the bulk material 15 as the crater formed in the bulk material is enlarged. If the pressure-absorbing pipe 71 is not fixedly retained by means of the brackets 73 but is merely journaled for rotation on the protective tube 24, the pipe 71 will participate in the rotation of the tube 24 as soon as the cylindrical hole has been dug around the vertical conveyor and its surrounding tube 24 and pipe 71.

The scraper conveyor 27, 28 is exposed to great stresses during the initial excavation of the cylindrical hole around the protective tube 24 and the pressure-absorbing pipe 71. In order to reduce these stresses on the shaft 26, the free end of the scraper conveyor 27, 28 may be secured against the protective tube 24 by means of a safety bracket and locking pin 74.

The invention has been described above in conjunction with the unloading of vessels. However, the unloading apparatus according to the invention may be utilized for all types of storage spaces irrespective of whether they are based on land or are located in a vessel. Hence, the invention may be be used with great advantage in cement silos, grain silos and other land-based storage spaces from which bulk material is to be unloaded.

I claim:

1. An apparatus for unloading bulk material from a storage space such as a cargo hold or a silo, the apparatus comprising a vertical conveyor whose inlet end is located proximal the bottom of the storage space, and a scraper device which is operable to scrape the bulk material in a direction towards the inlet end of the vertical conveyor and which is swingable about the vertical axis of the conveyor, said scraper device having one end pivotally journaled proximal the inlet end of the vertical conveyor for movement between a raised position in which the scraper device extends upwardly substantially along the vertical conveyor, and a lowered position in which the scraper device extends along the floor of the storage space, said scraper device being telescopically extensible, a protective tube disposed about the vertical conveyor, said scraper device being pivotally journaled on said protective tube for movement between its raised position and its lowered position, said tube being rotatable about the vertical conveyor for swinging the scraper device around same.

2. Apparatus according to claim 1, in which the scraper device is provided with scrapers fixedly mounted on chains, characterized in that the scraper device is provided with three scraper chains disposed in side-by-side relationship, of which the intermediate scraper chain is protractible in a direction from the inlet end of the vertical conveyor.

3. Apparatus according to claim 1, in which the scraper device is in the form of a rotary shaft with at least one outer scraper flight extending along a helical line, characterized in that the rotary shaft is a telescoping feed screw with at least one helically extending outer scraper flight.

4. Apparatus according to claim 1, 2 or 3, characterized in that the scraper device is provided with a hydraulic piston and cylinder assembly for lengthening and shortening the scraper device.

5. Apparatus according to any one of claims 1 or 2, characterized in that the protective tube is surrounded, throughout the major portion of its length, by a pressure-absorbing pipe which comes into contact with the bulk material and in relation to which the protective tube is rotatable.

6. Apparatus according to any one of claims 1, 2 or 3 in combination with a transport vessel which has a noncircular storage space, said apparatus being located in the storage space and being affixed to the vessel.

7. An apparatus for unloading bulk material from a storage space such as a cargo hold or silo, comprising, a vertical conveyor having an inlet at its lower end, a protective tube which is disposed about the vertical conveyor and is rotatable about the vertical conveyor, a pressure-absorbing pipe surrounding a major portion of the length of the protective tube and vertical conveyor so as to come into contact with bulk material through which the vertical conveyor extends, a scraper device which is operable to scrape the bulk material in a direction toward the inlet of the vertical conveyor, said scraper device being pivotally connected to the protective tube near the inlet of the vertical conveyor for movement between a raised position in which the scraper device extends upwardly substantially along the vertical conveyor and a lowered position in which the scraper device extends along the floor of the storage space, said protective tube being rotatable relative to the pressure-absorbing tube whereby the pressure-absorbing tube prevents the bulk material from exerting frictional forces on the protective tube which would render rotation of the protective tube difficult.

8. Apparatus according to claim 7, in combination with a transport vessel which has a noncircular storage space, said apparatus being located in the storage space and being affixed to the vessel.

9. Apparatus according to claim 7 or claim 8 wherrein the scraper device is telescopically extensible.

* * * * *